P. H. BARTLETT.
METER AND INSTRUMENT SUPPORT.
APPLICATION FILED NOV. 14, 1917.

1,269,996.

Patented June 18, 1918.

INVENTOR
Percy H. Bartlett
BY
his ATTORNEY

UNITED STATES PATENT OFFICE.

PERCY H. BARTLETT, OF PHILADELPHIA, PENNSYLVANIA.

METER AND INSTRUMENT SUPPORT.

1,269,996.  Specification of Letters Patent.  Patented June 18, 1918.

Application filed November 14, 1917. Serial No. 201,899.

*To all whom it may concern:*

Be it known that I, PERCY H. BARTLETT, a subject of the King of Great Britain, residing at Philadelphia, in the county of Philadelphia and State of Pennsylvania, have invented a certain new and useful Improvement in Meter and Instrument Supports, of which the following is a specification.

The invention is a meter support and an inclosing box for apparatus to be used conjointly with the meter and consists in the construction, hereinafter set forth, whereby the box is made adaptable to meter casings of different shapes, and to the reception of varying numbers of leads, and whereby a separate supporting base or back-board is rendered unnecessary, and whereby the parts are simplified and cheapened.

Figure 1:
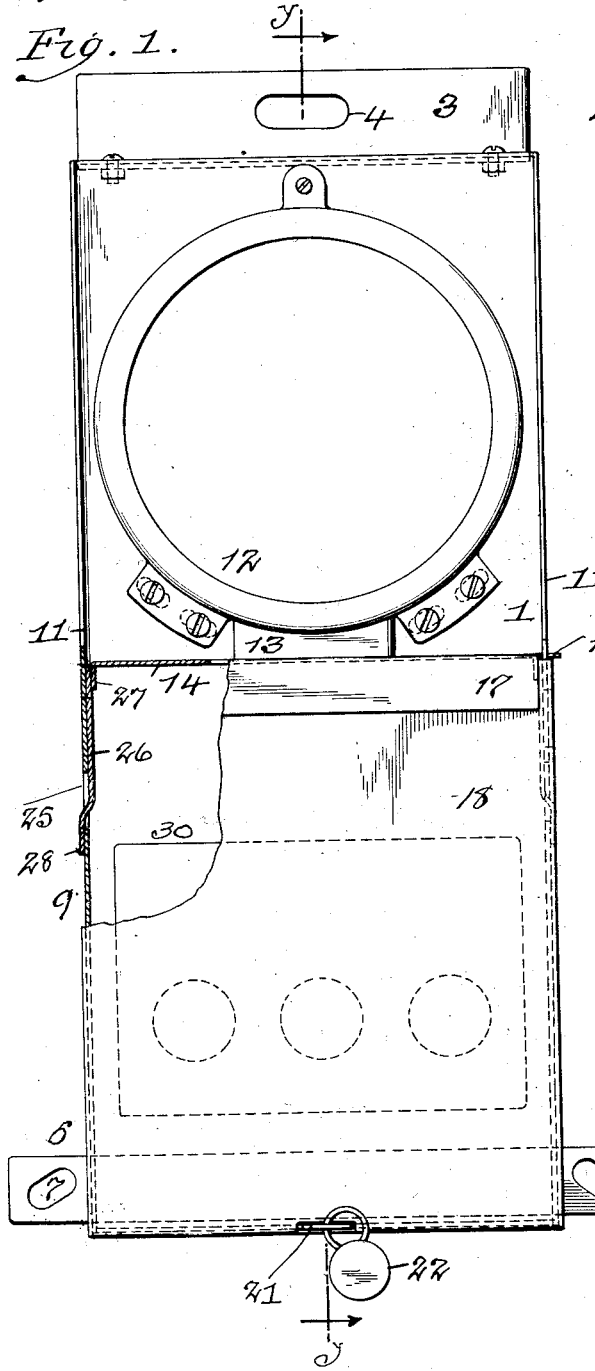
Figure 2:
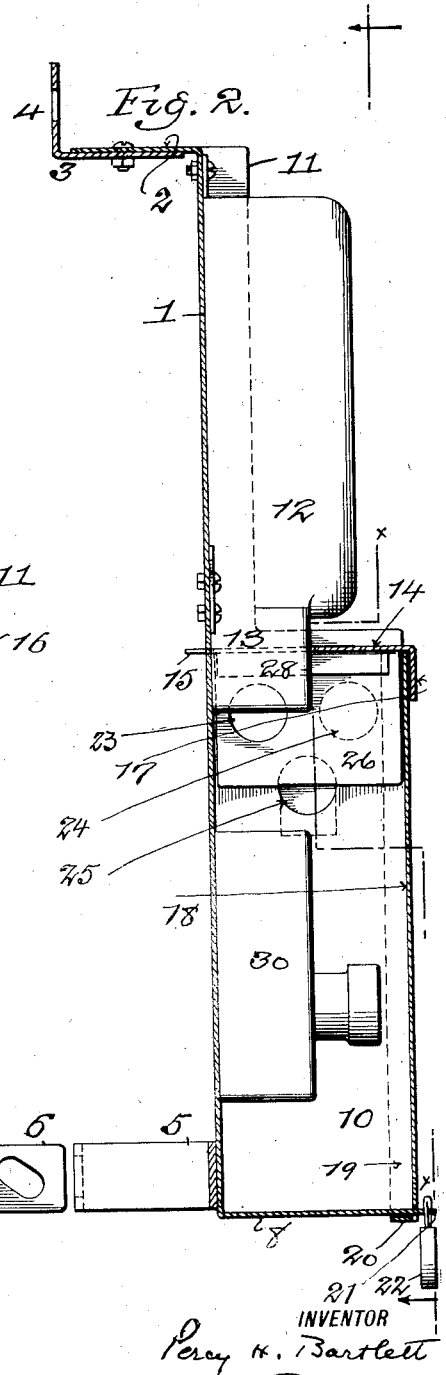

In the accompanying drawings, in which the circuit leads and electrical connections are omitted, Figure 1 is a front view of my device, a portion being broken away, and shown in section on the line $x$, $x$ of Fig. 2.

Fig. 2 is a section on the line $y$, $y$ of Fig. 1.

Similar numbers of reference indicate like parts.

1 is a back plate of sheet metal, having its upper edge flanged over at 2. To said flange is bolted the plate 3, bent at right angles and provided with an opening 4, for the reception of the bolt, not shown, by which said back plate 1 is secured to a wall. Near the bottom of plate 1 are secured two brackets 5, having laterally projecting flanges 6, also provided with openings 7 for the reception of similar securing bolts. The lower end of plate 1 is bent at right angles to form the bottom wall plate 8 of the box. The sides of plate 1 are bent in the same direction as bottom wall plate 8 to form the side wall plates 9, 10 of the box, and are united to the ends of said bottom wall plate in any suitable way. Said side wall plates extend upward from the bottom wall plate for a portion only of back plate 1. Above said side wall plates, the back plate 1 is bent to form relatively narrow flanges 11, which may be integral with side wall plates 9, 10.

The meter casing 12 is here shown as cylindrical, with a downward rectangular projection 13. On the casing are lugs which receive the bolts by which said casing is secured to back plate 1 above the box. The projection 13 of the meter casing enters and closes an edge recess in the top wall plate 14. On the rear edge of said plate are tongues 15 which are received in suitable slots in back plate 1, and on each of the side edges of said plate 14 is a tongue 16 (one shown in Fig. 1) which tongues are received in slots in the side wall plates 9, 10 of the box. These tongues support the top wall plate 14, and also permit of its ready removal.

The front edge of top wall plate 14 extends beyond the vertical front edges of side wall plates 9, 10, and is turned downwardly to form a flange 17. The front wall plate or cover 18 of the box is a separate plate, bent at its edges to form side flanges 19, and a bottom flange 20. In placing plate 18 in position, its upper edge is inserted in the clearance between flange 17 and the vertical edges of the side wall plates 9, 10. The side flanges 19 lap over said edges, and the bottom flange 20 laps over the outer edge of bottom wall plate 8 on each side of a tongue 21 which projects from said edge and enters a slot in front wall plate 18. Said tongue is perforated to receive the shackle of a seal fastening 22, which prevents removal of said front wall plate 18.

In each side wall plate 9, 10, near the top, I form three openings 23, 24, 25. On the inner surface of each side wall plate, I apply an adapter plate 26, the upper edge of which is received between a flange 27 on the edge of top wall plate 14 and on each side of tongue 16 thereon. On the lower edge of said plate is a tongue 28 which passes through the opening 25 and lies against the outer face of the side wall plate 9, the adapter plate being thus supported by said tongue. In the adapter plate is a single opening which registers with the opening 23, the openings 24, 25 being closed by said plate. The purpose of the openings 23, 24, 25 is to permit of introducing the circuit leads into the box for connection to whatever apparatus may be inclosed therein—such, for example, as a cut-out or fuse box 30. The function of the adapter plate 26 is to enable the user, who may desire to introduce the leads through one or two of the openings 23, 24, 25, as the case may be, to close the openings, or opening, not so used. Thus when the adapter plate is removed, all three openings 23, 24, 25 are available; when the adapter plate has two openings registering with openings 23, 24, opening 25 is closed, and when the adapter plate has but one opening, as here shown, openings 24 and 25 are closed.

Among the advantages, which it is the object of the present structure to secure, the following may be noted.

The device requires no separate back or base plate, or similar support, which is fastened to the wall, and to which in turn the device is attached. The back plate 1, together with its supporting brackets 3, 5, performs the function of such a separate base plate, while directly carrying the meter 12 and the inclosing box, and forming by its flanges 8, 9, 10, the bottom wall plate and side wall plates of said box. Because said side wall plates and bottom wall plate integrally form a part of the back plate 1, and because of the flanges 11 on the portion of said back plate, to which the meter casing is secured, said plate is rendered amply rigid.

When the front wall or cover plate 18 is taken off, the top wall plate 14 is easily removable. This permits of another top wall plate being substituted, in which there may be a differently shaped recess to receive and fit upon the lower portion 13 of the meter casing which enters the box. Thus in the construction shown in the drawings, the meter casing has a rectangular downward projection 13 which enters and fits in a correspondingly shaped recess in said top wall plate. In different meter casings, this projection may vary in dimensions or shape; that is, it may be, for example, of different dimensions in cross sectional area; or it may be of a different cross sectional shape; or it may be absent altogether, and a portion of the meter casing proper may enter the box. In such cases, the recess in the top wall plate 14 should correspondingly vary in form or dimensions. In adapting the device to such variations, all that is required is to put in a top wall plate provided with a suitably formed recess, but otherwise the same as here shown. The user, therefore, in changing from a meter casing of certain shape to one of different shape, as described, has only to substitute a top wall plate, suitably recessed, to suit the substituted meter casing. Obviously, a simple flat plate, such as 14, is easily attached by its integral tongues 15, 16, and the recess, whatever its shape, is easily cut out at the rear edge.

The single seal fastening locks all parts of the box together, and prevents access to the inclosed apparatus and connections without first mutilating the seal. The side flanges 19 on the cover or front wall plate 18 prevent springing apart the side wall plates 9, 10 to allow of withdrawal of the top wall plate tongues from the slots in said side wall plates, and the flange 17 on the top wall plate 14 prevents the upper edge of the front or cover plate 18 from being sprung away from the side wall plates 9, 10.

I claim:

1. A meter, apparatus to be used conjointly therewith, and a metal box wholly inclosing said apparatus and having one wall extended; the said meter being attached directly to said wall extension.

2. The combination of claim 1, further characterized by an opening in the box wall facing said meter, which opening is entered and closed by said meter.

3. The combination of claim 1, and integral stiffening flanges on opposite edges of said wall extension.

4. A box of sheet metal, comprising a back plate, side and bottom flanges integrally formed thereon and constituting the side and bottom wall plates of said box, a top wall plate for said box, means for detachably securing said top wall plate to said back plate and said side wall plates, a front wall plate for said box, and means for detachably securing said front wall plate to said bottom wall plate and said top wall plate.

5. A box of sheet metal, comprising a back plate, side and bottom flanges integrally formed thereon and constituting the side and bottom wall plates of said box, a top wall plate for said box, a flange on said top wall plate overlapping the edges of said side wall plates, there being a clearance between said flange and said edges, a front wall plate entering at one end into said clearance, and means for detachably securing said front wall plate to said bottom wall plate.

6. A meter support and an inclosing box for apparatus to be used conjointly with the meter, comprising a metal back plate, and a box thereon partly covering said plate, and having a removable top wall plate; there being a recess in the edge of said wall plate adapted to receive and to be closed by the casing of said meter.

7. An inclosing box for electrical apparatus having in its wall a plurality of openings for the passage of circuit leads to said apparatus, and an adapter plate having a single opening registering with one of said wall openings the said plate extending over and covering the remainder of said wall openings, and means for securing said adapter plate on the inner side of said wall.

8. An inclosing box, as in claim 7, the said adapter plate-securing means being a tongue on said plate, entering and engaging in one of said covered openings.

9. In combination, a switch box comprising a box body open at one end to receive the electrical connections of a meter and the back of said body being extended at said open end to form a supporting panel for a meter and a cover secured to said box body and adapted to cover the connections of the meter mounted on said supporting panel.

10. A switch box open at one end to receive the electrical connections of a meter, and having an extension at said end forming a supporting panel for a meter, said switch box having movable cover which may be opened to expose the connections of the meter mounted on said panel.

In testimony whereof I have affixed my signature in presence of two witnesses.

PERCY H. BARTLETT.

Witnesses:
  GERTRUDE T. PORTER,
  MAY T. McLARRY.